United States Patent [19]
Thomas

[11] Patent Number: 4,644,876
[45] Date of Patent: Feb. 24, 1987

[54] KNOCKDOWN TABLE OR THE LIKE

[75] Inventor: Clayton A. Thomas, Sinclair Dr., Sinclairville, N.Y. 14782

[73] Assignee: Richard A. Noon, Jamestown, N.Y.

[21] Appl. No.: 861,131

[22] Filed: May 8, 1986

[51] Int. Cl.[4] .............................................. A47B 47/00
[52] U.S. Cl. ................................... 108/111; 108/154; 108/156
[58] Field of Search ................ 108/62, 154, 156, 111; 248/165; 211/186, 133

[56] References Cited

U.S. PATENT DOCUMENTS

| | | | |
|---|---|---|---|
| 1,758,476 | 5/1930 | Rice | 108/111 X |
| 1,978,650 | 10/1934 | Shannon | |
| 2,667,470 | 5/1954 | Catalano | |
| 3,851,600 | 12/1974 | Kohl | |
| 4,119,045 | 10/1978 | Michelotti | 108/111 X |
| 4,158,336 | 6/1979 | Brescia | 108/156 X |
| 4,501,369 | 2/1985 | Fox | 108/111 X |

OTHER REFERENCES

Pelican Mechanics Tool Box Center, Tool Boxes & Accessories, Tool Storage Systems, Jamestown, N.Y. U.S.A.

Primary Examiner—Peter A. Aschenbrenner
Attorney, Agent, or Firm—Christel, Bean & Linihan

[57] ABSTRACT

A knockdown table or the like consisting of four legs of L-shaped cross section and top and bottom invertible pan assemblies which when in one position form a tray or in the other position form a shelf. Each of the pan assemblies is provided with outside corner straps which may snugly receive the legs. The legs are provided with lower abutment means which support the bottom pan assembly when assembled, the lower abutment means in turn receiving the shank of a caster wheel assembly. The top tray is provided with a flange like structure along the edges of its sidewalls which flange like structure extends from one corner at another of each sidewall and which may rest on top of the legs when the top pan assembly is in its tray position. In addition, the top pan assembly is also provided with inner straps which may snugly receive the ends of the legs remote from the abutment means of the legs so that the upper pan assembly may be disposed in a shelf position, the support surface of the upper pan assembly resting on the upper ends of the legs.

4 Claims, 8 Drawing Figures

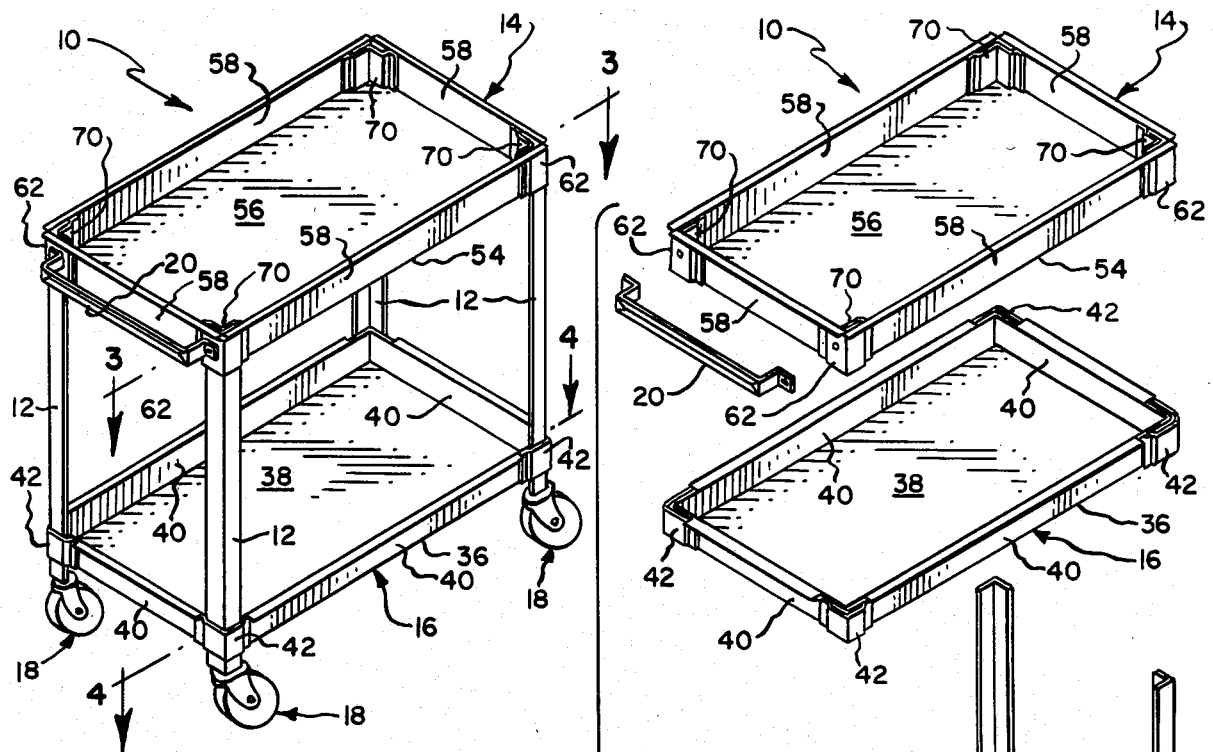
Fig. 1.
Fig. 2.
Fig. 3.
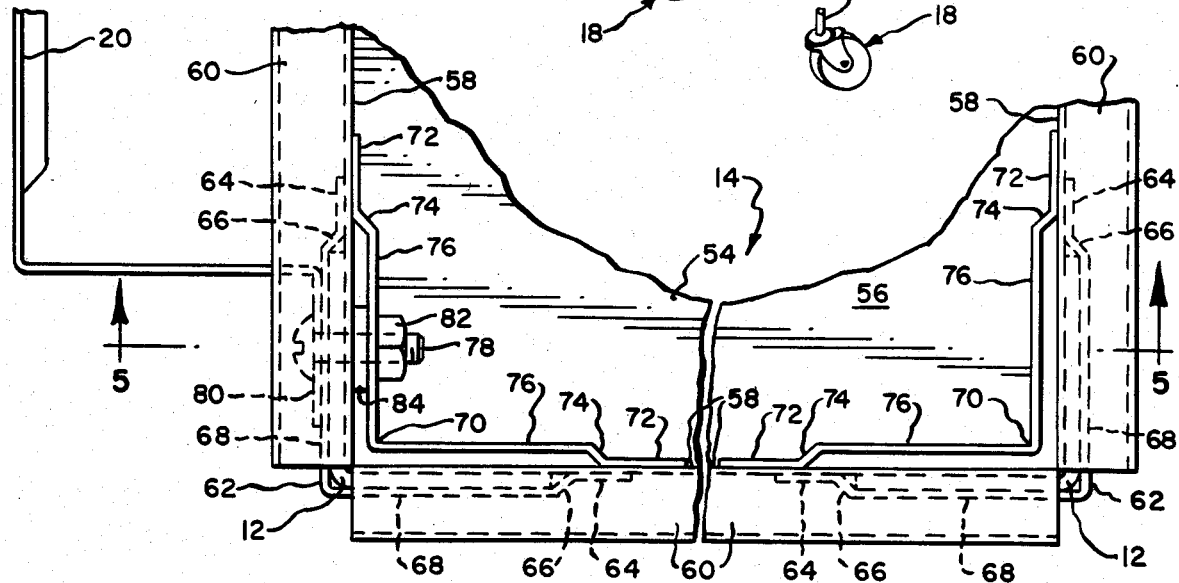

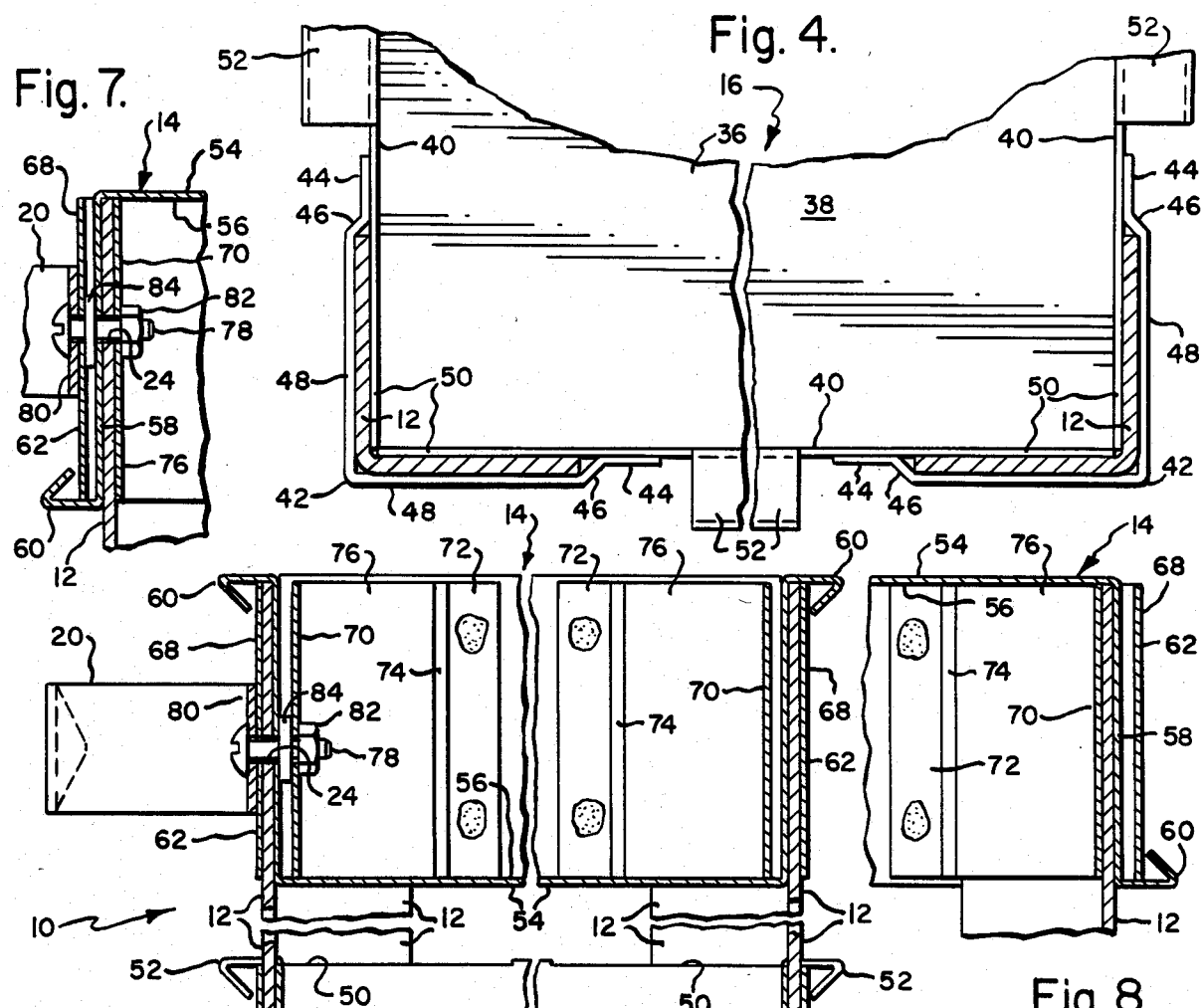
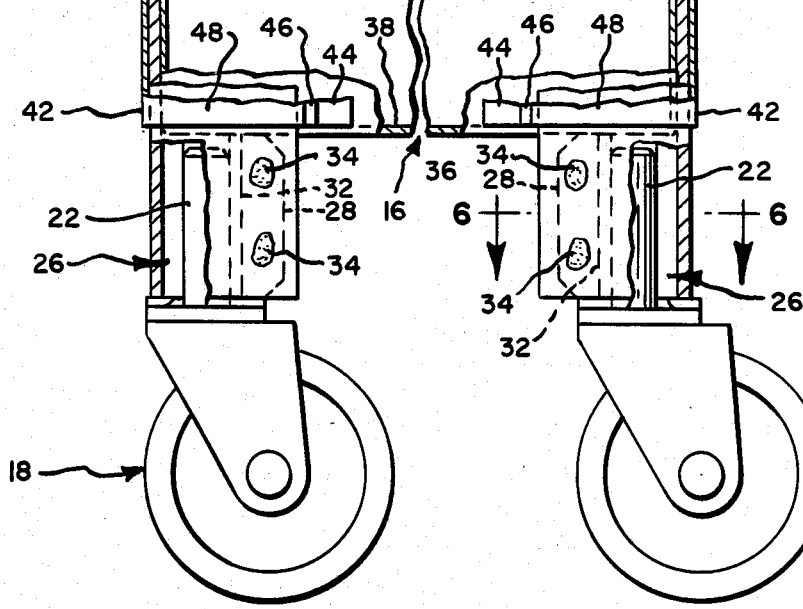
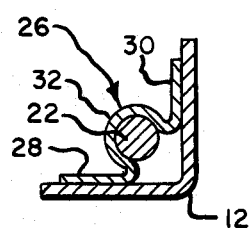

KNOCKDOWN TABLE OR THE LIKE

TECHNICAL FIELD

The present invention relates generally to support structures or the like, and more particularly to a readily assembled or disassembled support structure in the form of a knockdown table or the like having top and bottom invertible pan assemblies, which, when assembled are supported by four independent legs.

BACKGROUND OF THE INVENTION

In the past, it has been known to provide knockdown tables or the like, a typical example being a shop service cart provided with top and bottom invertible pan assemblies and four legs, which assembly can be bolted together its desired assembled position with either shelf being in a tray position or in a shelf position. This form of assembly is also provided with casters and a handle for facilitating the movement of the cart about a shop. While this form of design is satisfactory for its intended purposes, it requires a fair amount of time to assemble or disassemble the cart.

U.S. Pat. No. 2,677,470 discloses a boltless form of knockdown table or cart having upper and lower support surfaces, which design can be readily assembled or disassembled. While this form of design requires very little assembly or disassembly time, it is necessary to provide corner holes in each of the bottom pan assemblies which in turn receive support pins carried by the legs. If the corner holes are not located precisely in the corners, the pin must be disposed a sufficient distance away from the inner surfaces of the leg to receive the holes when the lower pan structure is disposed in its tray position. This will permit the lower pan to wobble thus making the desired structure unstable. In addition, as the pin can be bent, this will also tend to make the assembled structure inherently unstable when the pin is bent. Additionally, the top pan assembly is supported by an abutment secured to the inner surface of the legs near the top. If this abutment is not precisely located, it is possible for the leg to either project above the top surface of the tray, which would be undesirable, or else not to have it extend the full length of the sidewalls of the tray, which would further reduce the stability of the unit.

OBJECT OF THE INVENTION

It is a principal object of the present invention to provide a knockdown table or the like having top and bottom invertible pan assemblies which can be readily assembled in either tray or shelf position, which structure when assembled will be relatively stable.

The foregoing object and other objects and advantages of this invention will become more apparent to those skilled in the art after considering the following detailed description taken in conjunction with the accompanying drawings in which a preferred form of this invention is illustrated.

DESCRIPTION OF THE FIGURES

FIG. 1 is a perspective view of the knockdown table or the like of this invention in which the top and bottom pan assemblies have been assembled as trays.

FIG. 2 is an exploded perspective view of the assembly shown in FIG. 1.

FIGS. 3 and 4 are enlarged partial sectional views taken along the lines 3—3 and 4—4 in FIG. 1.

FIG. 5 is a sectional view taken generally along the line 5—5 in FIG. 3.

FIG. 6 is a sectional view taken generally along the line 6—6 in FIG. 5.

FIGS. 7 and 8 are partial sectional views showing the top pan assembly assembled in an inverted manner to form a shelf.

DETAILED DESCRIPTION

Referring first to FIGS. 1 and 2 the knockdown table or the like of this invention is indicated generally at 10 and consists of a number of major components, these being four substantially identical legs 12, a top pan assembly indicated generally at 14 and a bottom pan assembly indicated generally at 16. To permit the table to be wheeled about, the knockdown table may further be provided with four caster wheel assemblies indicated generally at 18 and a handle 20. Each of the caster wheel assemblies 18 is of generally conventional construction and will not be described in further detail except to note that each is provided with an upwardly extending shaft or shank 22.

Each of the legs 12 is substantially identical although at least two legs may be provided with apertures 24 for the reception of the bolts which may be provided to hold the handle 20 to the top pan assembly 14. While only two of the legs are shown provided with such apertures, it should be noted that in order to facilitate assembly and reduce the number of parts that in production all legs may be provided with such apertures. One end of each leg is provided with abutment means, which in the embodiment illustrated is the sleeve assembly for receiving the shank 22 of the caster wheel assembly. This sleeve assembly, which is indicated generally at 26 in FIG. 6, consists of a single piece of metal which is formed into the shape illustrated, the single piece of metal having two planar members 28 and 30 and an intermediate cylindrical portion 32 which is adapted to receive the shank 22 of the caster wheel assembly. The portions 28 and 30 are secured to the inner surfaces of the legs by spot welds 34 (FIG. 5) or the equivalent.

The bottom pan asembly 16 includes a principal support member 36 formed from a single sheet of sheet metal, the principal support member being formed into a generally open box like rectangular construction having a generally planar support portion 38 and four sidewalls 40 extending at right angles to the perimeter of the planar support portion. Each bottom pan assembly is further provided with four outside corner straps 42 mounted on outer surface portions of the sidewalls 40, the corner straps being of the configuration best illustrated in FIG. 4. Thus, each corner strap 42 has an end planar portion 44 which is adapted to be secured to the outer surface of the associated sidewall 40 by spot welds or the like, angled portions 46 and an intermediate portion 48 having a right angle bend therein. As can be seen from FIG. 4, the intermediate portion is disposed away for the outer surface of the adjacent sidewalls 40 to such an extent that one of the legs 12 can be snugly received between the intermediate portion of the outside corner strap and the adjacent surface of the sidewalls. Thus, the bottom pan assembly 16 can be assembled onto the legs 12 by merely telescoping the legs through the space between the intermediate portion 48 and the adjacent sidewall 40 until the bottom pan assembly contacts the abutment means 26. The bottom pan can be assembled in the manner shown in FIG. 5 wherein the planar support portion 38 abuts against the sleeve assembly 26. Alternatively, the lower pan assembly can be inverted in which case the side wall edge 50 will contact the sleeve assembly 26. The sidewall edge between the straps 42 may be provided with a J-shaped lip 52, best shown in FIG. 5, for the purpose of strengthening the sidewall 40.

With reference now to the top pan assembly 14, it is formed in a somewhat similar manner to the bottom pan assembly and also has a principal support member 54 formed from a single sheet of sheet metal, the support member in turn including a planar support portion 56 and perimeter sidewalls 58 at right angles to the portion 56. The edges of the sidewalls 58 remote from the support portion 56 are formed into J-shaped lips or stop means 60, but unlike the bottom pan member the J-shaped lips extend from one corner of the pan to the other corner. In this regard it should be noted that as the legs 12 must pass between the intermediate portion 48 of straps 42 and sidewalls 40 in the bottom pan assembly the J-shaped lips 52 cannot extend from corner to corner as they would interfere with the passage of the legs in the through the bottom pan assembly. However, a stop surface or flange portion of the J-shaped lips 60 on the top pan assembly will be contacted by the upper end of the legs when the top pan assembly is assembled in the manner shown in FIG. 5, the legs thus supporting the top pan assembly. The top pan assembly is also provided with four outside corner straps 62 of the same configuration as the outside corner straps 42 of the lower pan member, the configuration of which can best be seen from FIG. 3. Thus each strap has an end planar portion 64 which can be spot welded to a sidewall 58, and angled portion 66, and an intermediate portion 68 which is spaced away from the sidewalls 58 to provide a space which can snugly receive the end of the leg 12 which is remote from the sleeve assembly 26. In addition the top pan assembly is further provided with four inside corner straps 70. Each inside corner strap extends from one surface portion of one sidewall to an inside surface portion of an adjacent sidewall. Its configuration can best be seen from FIG. 3 and thus each corner strap has an end planar portion 72 which may be spot welded or otherwise rigidly secured to the inside surface of a sidewall, an angled portion 74, and an intermediate portion which is disposed away from the inside surface of the adjacent sidewalls to such an extend that one end of a leg 12 can be snugly receive between the intermediate portion of the inside corner strap and the adjacent inside surface of the sidewalls. The purpose of the inside corner straps is to permit the upper pan assembly to be mounted in an inverted position with the surface 56 forming a shelf. This configuration is shown in FIGS. 7 and 8 and it should be noted that the upper end of the legs 12 pass between the intermediate portion 76 and an adjacent sidewall 58, the upper ends of the legs abutting against the planar support portion 56.

The handle 20 can be secured to the upper pan assembly either in its tray configuration as shown in FIG. 5 or in its shelf configuration as shown in FIG. 7. To this end, a bolt 78 is passed through an apertured end portion 80 of the handle and corresponding aligned (drilled) apertures in straps 62 and 76, sidewall 58, and the aperture 24 in leg 12, the bolt 78 being secured in position by nut 82. In order to prevent deformation of the strap which does not receive the leg 12, a spacer 84 may be employed, which spacer can be in the form of a washer.

The knockdown table of this invention will customarily be sold disassembled. To assemble it, it is only necessary to insert the legs 12 between the intermediate portion 48 of corner straps 42 and the sidewalls 40 in the lower member until all legs are fully inserted where the sleeve assembly 26 contact or abuts the bottom pan assembly 16. This abutting position can be when either the portion 38 contacts the top of the sleeve assembly 26 as shown in FIG. 5, or when the edge 50 of the sidewall remote from the sheet metal contacts the sleeve assembly 26. Assuming that the top pan assembly is to be assembled in the position shown in FIGS. 1 and 5, the top end portions of the legs 12 are then inserted between the intermediate portion 68 of outer straps 62 and the outer surfaces of the sidewalls 58 until the top edge of the leg abuts the J-shaped lip 60 as shown in FIG. 5. At this point it is only necessary to insert the caster shanks 22 into the cylindrical portion 32 of the sleeve assembly, the caster shank portion typically being provided with retaining means in the form of a compressible ring (not shown) which will maintain the caster shank in the sleeve once inserted. Finally, it is only necessary to assemble the handle as shown. In the event that the upper pan assembly is to be used as a shelf, as shown in FIGS. 7 and 8, the pan assembly is inverted, and the top end portions of the legs 12 are then inserted between the intermediate portion 76 of inner straps 70 and the inner surfaces of the sidewalls 58 until the top edge of the leg abuts the planar support portion 56. The handle 20 is then assembled in the same manner as set forth above.

While a preferred structure in which the principles of this invention have been incorporated is shown and described above, it is to be understood that the invention is not to be limited to the particular details shown and described above, but that, in fact, widely differing means may be employed in the practice of the broader aspects of this invention.

What is claimed is:

1. A knockdown table or the like capable of being readily assembled or disassembled without tools comprising:

four elongated legs of L-shaped cross section, each leg being provided with abutment means on its inner surface adjacent one end; and top and bottom pan assemblies adapted to be assembled to said legs to form a load bearing assembly having upper and lower support portions, each assembly including a principal support member of generally open box-like rectangular construction, each support member having a rectangular generally planar support portion and four sidewalls extending at right angles to the perimeter of the planar support portion, each of said pan assemblies further including four outside corner straps mounted on outer surface portions of said sidewalls, each outside corner strap extending from one outer surface portion of one sidewall to an outer surface portion of an adjacent sidewall and having an intermediate portion disposed away from the outer surface of said sidewalls to such an extent that one of said legs is adapted to be snugly received between the intermediate portion of the outside corner strap and the adjacent outer surfaces of said sidewalls, said top pan assembly further including four inside corner straps mounted on inside surface portion of said sidewalls, each inside corner strap extending from one inside surface portion of one sidewall to an inside surface portion of an adjacent sidewall and having an intermediate portion disposed away from the inside surface of said sidewalls to such an extent that one of said legs is adapted to be snugly received between the intermediate portion of the inside corner strap and the adjacent inside surfaces of said sidewalls, and said top pan assembly further including stop means spaced away from said planar support portion and extending between the intermediate portion of the outside corner straps and the adjacent sidewalls, wherein the bottom pan assembly may be assembled to said four legs in such a manner that either the support portion contacts the stop means so that the bottom pan assembly is in its tray position or the sidewall edge remote from the support portion contacts the abutment means so that the bottom pan assembly is in its shelf position, and wherein the top pan assembly may be assembled to said four legs in such a manner that either the legs pass between the intermediate portions of the outer straps and the adjacent outer surface of the sidewalls with the top ends of the legs contacting the stop means so that the top pan assembly is in its tray position, or wherein the top pan assembly may be assembled to said four legs with said legs passing between the intermediate portions of the inner corner straps and the inner surfaces of the adjacent sidewalls with the top ends of the legs contacting the support portion so that the upper pan assembly forms a shelf.

2. The knockdown table or the like as set forth in claim 1 wherein the abutment means on said elongated legs are sleeve assemblies capable of receiving the shank of a caster wheel assembly 3. The knockdown table or the like as set forth in claim 2 further characterized by the provision of four caster wheel assemblies, each being provided with a shank which may be received within said sleeve assemblies.

4. The knockdown table or the like as set forth in claim 1 further characterized by the provision of handle means capable of being secured to said top pan assembly and two of said four legs, said handle means including spaced apart apertured planar portions, two of said legs being provided with apertures alignable with the apertures in said apertured planar portions, and said top pan assembly further being provided with sets of aligned apertures through adjacent sidewalls and inside and outside straps which may be placed in alignment with the apertures in said handle means whereby the handle means may be assembled to the top pan assembly and two of the legs by passing bolts through aligned apertures and securing the bolts in place by nuts.

* * * * *